United States Patent [19]
Dietrich

[11] Patent Number: 5,168,829
[45] Date of Patent: Dec. 8, 1992

US005168829A

[54] VERSA CAGE SYSTEM
[76] Inventor: Bruce E. Dietrich, 900 S. Grand Ave., Charles City, Iowa 50616
[21] Appl. No.: 714,070
[22] Filed: Jun. 12, 1991
[51] Int. Cl.⁵ ............................................. A01K 1/00
[52] U.S. Cl. ...................................... 119/17; 119/15
[58] Field of Search ............................ 119/15, 17, 19
[56] References Cited
U.S. PATENT DOCUMENTS
3,536,044 10/1970 Stephens ................................ 119/17
3,662,713 5/1972 Sachs ..................................... 119/15
3,731,657 5/1973 Alessio .................................. 119/17
3,771,686 11/1973 Brison ................................... 119/19

Primary Examiner—John G. Weiss

[57] ABSTRACT

An animal cage that is a one piece rotational molded polyethylene composition housing with an electropolished stainless steel door and a CAD/CAM laser cut electropolished double self-latching mechanism that utilizes a unique stacking system for multiple cage or ward-like arrangements to provide comfortable humane housing for small animals larger than rodents.

3 Claims, 6 Drawing Sheets

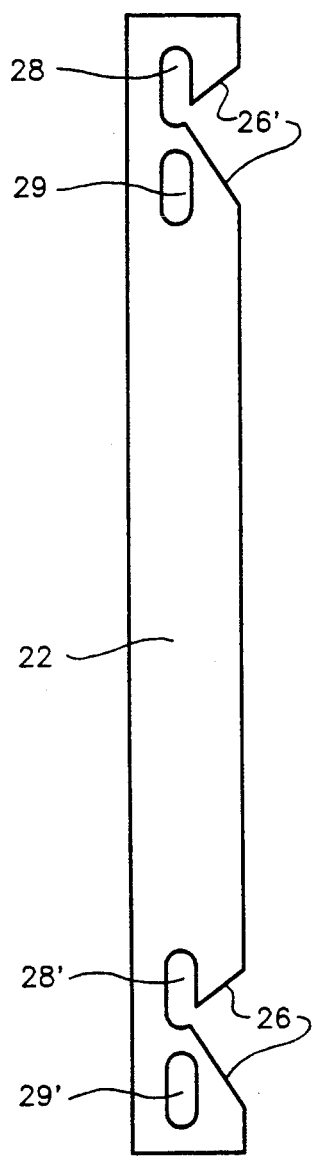
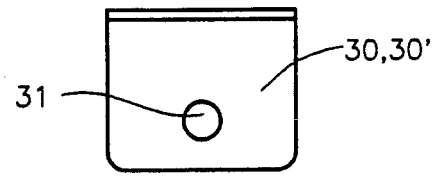
FIG. 8
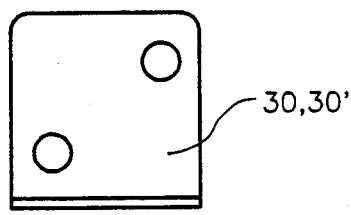
FIG. 9
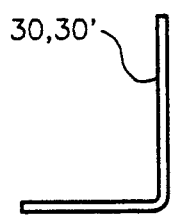
FIG. 10
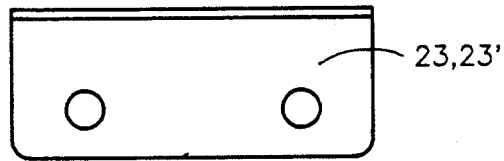
FIG. 11
FIG. 7
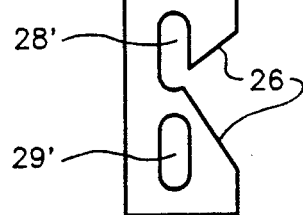
FIG. 12
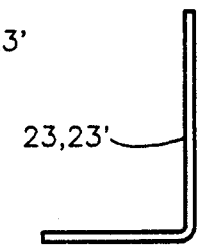
FIG. 13

VERSA CAGE SYSTEM

SUMMARY

The VERSA CAGE SYSTEM is a unique and economical method to house small animals larger than rodents. The combination of polyethylene and stainless steel in sizes large enough to contain small animals has not been used before. The manufacturing processes used to produce the integral parts of the cage are unique to this application.

HISTORY OF THE INVENTION

Small animals, animals larger than rodents, have traditionally been housed in cages comprised of stainless steel, fiberglass, or plastic laminate. Each of these materials has its shortcomings. Stainless steel is expensive, cold, dark and noisy, but lasts forever. Fiberglass cracks, chips and is available in limited sizes, but is warm. Plastic laminate is adhered to a particle type board, which allows it to detach itself from the board, cracks, chips and serves as a source of infection, but is less expensive. Both the fiberglass and plastic laminate cages offer only aluminum doors which pit and are corrosive upon constant exposure to fecal and urine materials. Most of these caging materials are expensive to purchase. A new caging unit that combines all of the positive qualities of the above choices; warm, quiet, non-corrosive and is less expensive spawned the idea for the VERSA CAGE SYSTEM. The VERSA CAGE SYSTEM is comprised of: 1) Polyethylene; warm, quiet, allows penetration of light, does not crack or chip, and is impervious to urine and fecal materials, and 2) Stainless steel; which is recognized as an industry standard, for the door and latching mechanism.

BRIEF DESCRIPTION OF DRAWINGS

The drawings on pages 1 through 6 show various perspectives of the animal cage and specific views of its working parts.

FIG. 7 is a left side perspective view of the latch plate.

FIG. 8 is a top perspective view of the hinge bracket,

FIG. 9 is a front perspective view of the hinge bracket and

FIG. 10 is a side perspective view of the hinge bracket.

FIG. 11 is a top perspective view of the latch bracket,

FIG. 12 is a front perspective view of the latch bracket and

FIG. 13 is a side perspective view of the latch bracket.

DETAILED DESCRIPTION OF THE DRAWING

The VERSA CAGE SYSTEM is comprised of two raw materials; - polyethylene and stainless steel. These components of the cage will be discussed separately.

Figure 1:
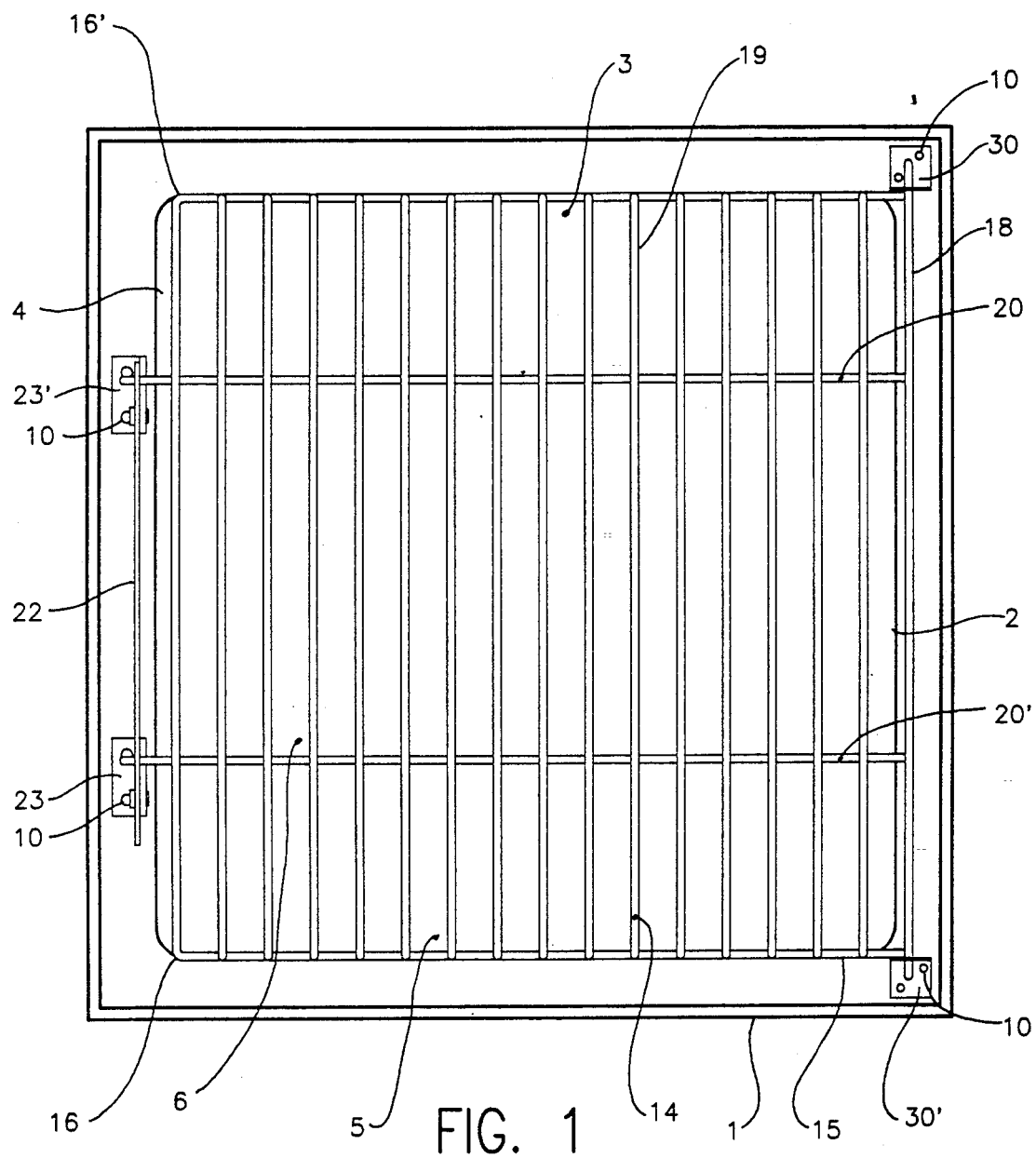
FIG. 1 is a front perspective view of the animal cage.
Figure 2:
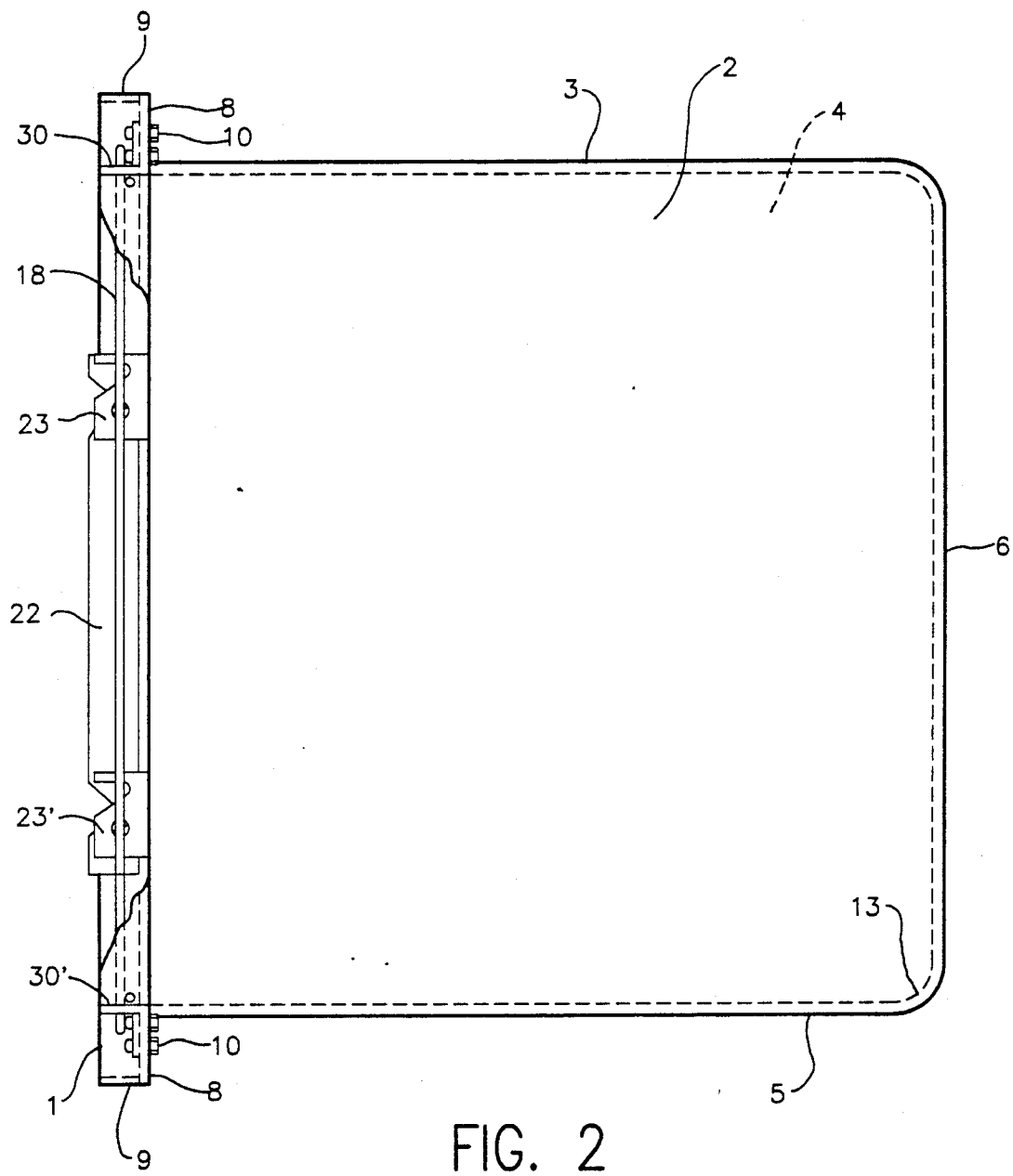
FIG. 2 is a right side perspective view of the animal cage.
Figure 3:
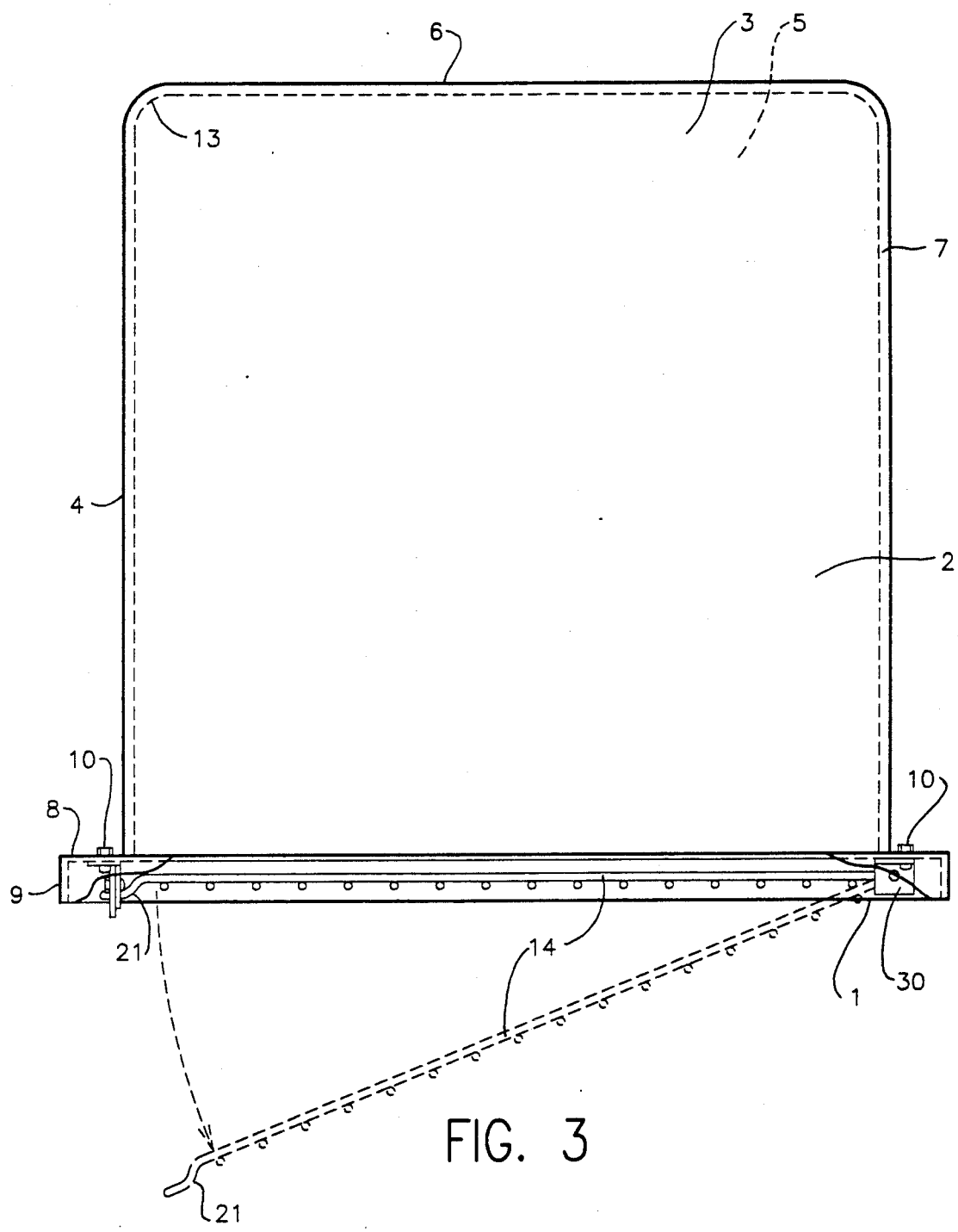
FIG. 3 is a top perspective view of the animal cage depicting the door both closed and partially open.

The cage housing is a white, one-piece molded medium density polyethylene unit, referred to as 1 in FIGS. 1, 2 and 3. The cage has four sidewalls 2, 3, 4, 5 and a back wall 6 each with a wall thickness of $\frac{1}{4}$" 7.

Figure 14:
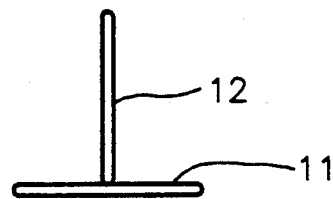
FIG. 14 is an end perspective view of the spacer.
Figure 15:
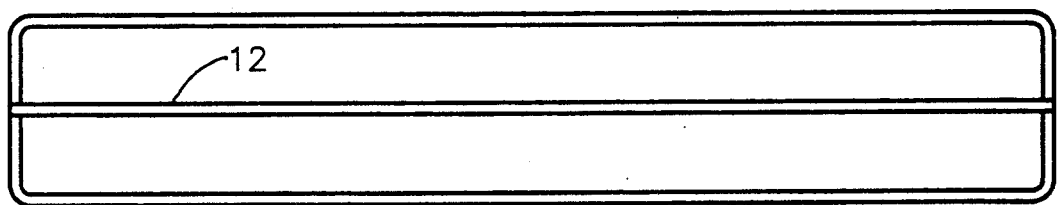
FIG. 15 is a top perspective view of the spacer.
Figure 16:
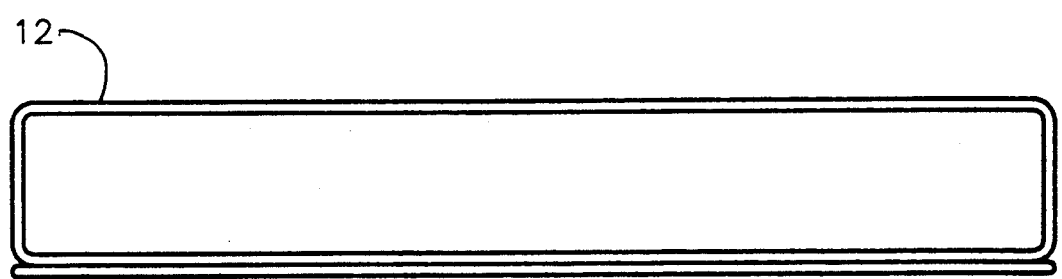
FIG. 16 is a front view of the spacer.

The front edge of the cage is L-shaped in design. One edge of the L 8 is 2" in length and provides an area for the fasteners 10 to be located. The other edge of the L 9 is $1\frac{1}{2}$" in length and serves both to support cages on top of itself of next to itself, and serves as an area to bolt the cages together to make a blank or ward like arrangement. When two cages are bolted together on top of each other, a 4" gap exists in the rear of the cage. A support or spacer FIGS. 14, 15, 16 is needed to keep the cage on top in a level plane. This spacer is composed of two $\frac{1}{4}$" wire rods welded together in a rectangular loop. The loops are then welded together to form a "T" with one loop 11 in a horizontal plane, and the other loop 12 perpendicular to it in a vertical plane. The front edge 8, 9 of the cage and the spacer 11, 12 combine to make a very easy method of arranging the cages in multiple units or banks. Banks of animal cages are the norm for the animal housing industry.

The cages are produced in various sizes. Small animals including rabbits, cats and dogs are comfortably housed in this cage. Other species of animals that are larger than rodents may also be contained in these cages.

Rotational molding is the manufacturing process used to produce this portion of the cage. This process takes a granular form of polyethylene, rotates and solidifies it with heat to conform to the mold. This molding process produces walls that are smooth and solid in material throughout its thickness. This material is impervious to urine and fecal materials. The 1" radius on the inside corners 13 makes the cage easy to clean. The use of this material contributes to the cages economy and provides a warm, quiet and comfortable kennel environment. These factors are of primary concern to animal health care professionals. The usage of this material in housing for small animals (larger than rodents) is new and unique to the industry. The method of molding the housing portion of the cage is also new and unique to the animal caging industry.

The stainless steel portion of the cage is composed of five parts. The usage of stainless steel for the operable portion of the cage is because it is a recognized industry standard and is easy to maintain. The production of these parts is unique to this system.

FIGS. 1, 2 and 3 also depict the cage door referred to as 14. The door is made of $\frac{1}{4}$" stainless steel rod. The frame of the door is one piece 15, bent to a slight radius at two corners 16, 16[1]. It is then wire welded to a hinge bar 18 which extends past the perimeter of the frame 1" to serve as the pin portion of the hinge. Rods spaced $1\frac{1}{2}$" on center 19, are wire welded to the frame parallel to the hinge bar. This rod spacing will comfortably contain small animals larger than rodents. Two horizontal rods 20, 20[1] spaced 6" from the perimeter and exactly 12" apart are wire welded to the vertical cross member rods 19. These two rods are offset 21 and extend 1" past the perimeter on one end to serve as part of the latching mechanism. At this junction an extra weld is made to insure stability at this critical point. All of the rods are doomed on their ends to ensure a smooth finish. The material used for the door is type 304 stainless steel. The door is electropolished after welding for a smooth, bright and easy to maintain finish. The one piece hinge bar on the door is a unique feature of this unit.

Figure 4:
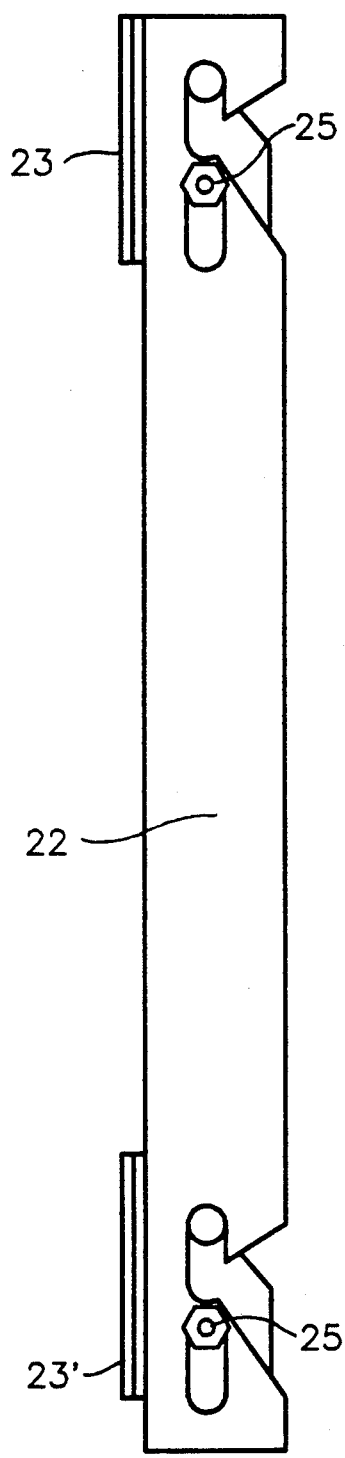
FIG. 4 is a left side perspective view of the latching mechanism.
Figure 5:
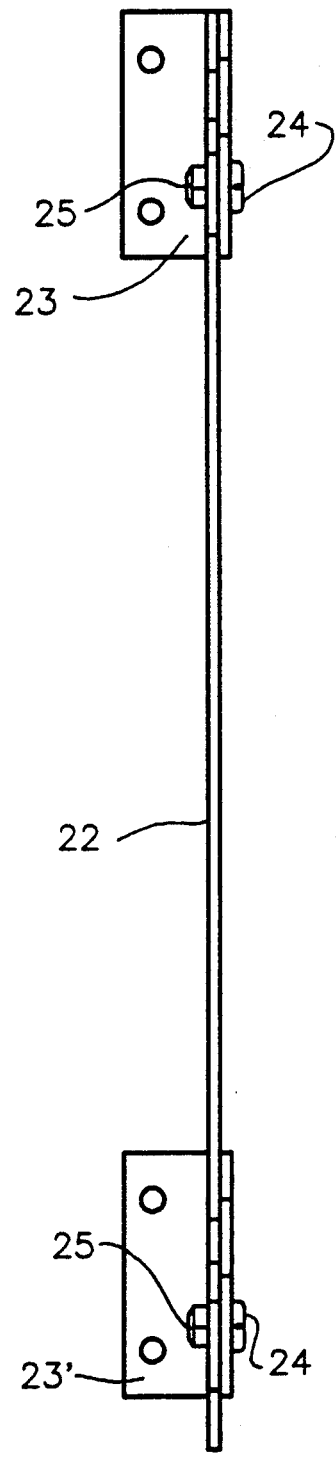
FIG. 5 is a front perspective view of the latching mechanism.
Figure 6:
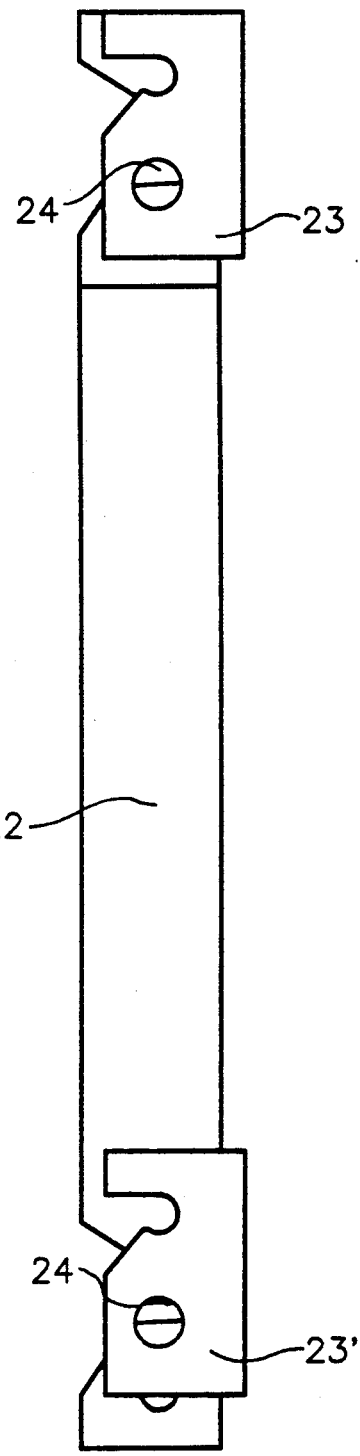
FIG. 6 is a right perspective view of the latching mechanism.

FIGS. 4, 5 and 6 depict the latching mechanism. The latch plate 22 is bolted to two latch brackets 23, 23[1], with ¼" stainless steel bolts 24 and stainless steel nylon lock nuts 25. The latch plate slides up and down on the latch bracket using the bolt 24 as a pin. The nylon lock nut 25 allows permanent adjustment of the tension of the latch plate 22. The angle 26, 26[1] on the latch plate FIG. 7 and the angle 27 on the latch bracket FIGS. 12, 23 are designed so that when the extended offset rods 20, 20[1], 21 on the door come in contact with the latch plate 22, the plate travels up, using the bolt 24 as a pin. The rods then pass by the angle 26, 26[1] in the plate, are stopped by the latch bracket 23, and the latch plate travels down entrapping the rods 20, 20[1] in its extended slot 28, 28[1]. The latch plate 22 is allowed to travel up and down on the bolt 24 through its extended slot 29, 29[1] which has no angle. This latching mechanism occurs at two points for maximum locking security. The double latching mechanism is self-locking in design and allows one hand operation for easy opening. The latch and hinges are of 16 gauge type 304 stainless steel and are electropolished for a smooth, bright and easy to maintain finish.

FIGS. 8, 9, and 10 depict the hinge bracket 30. The hinges are angled pieces of stainless steel, 30[1] allows the door to ride or swing open, FIG. 3, on it while the upper hinge 30 keeps the door from lifting out of place.

The method of producing the latch plate, latch bracket and hinge bracket is through laser cutting. All cutting instructions to the laser are generated by Computer-Aided Drafting/Manufacturing (CAD/CAM) programs. This method of manufacturing is new and unique to the caging industry.

The fasteners 10 are the other integral portion of the caging system. All fasteners are ¼" stainless steel bolts with stainless steel washers and stainless steel kep nuts.

The VERSA CAGE SYSTEM is an animal cage similar to no other cage. The combination of materials; polyethylene and stainless steel, and the production of the component parts, rotational molding of the polyethylene and laser cutting of the stainless steel latching mechanism are unique to the cage manufacturing business.

Having described and disclosed the nature of this invention I claim:

1. A primary small animal enclosure comprising;
   a one piece molded polyethylene cage having four smooth sidewalls and a smooth flat back wall attached to said four sidewalls, an integral connection between each of the four sidewalls and the back wall forming smooth rounded corners having an inside radius that permits easy cleaning of the cage, said cage's four sidewalls forming a front opening from which a first edge extends a short distance perpendicularly outwardly away from each said sidewall, a second edge extending perpendicularly from each said first edge away from the back wall and parallel to the sidewalls, said first and second edge forming an L-shaped flange surrounding the sidewalls to increase the rigidity and strength of the cage, said second edge also serves to support and secure other cages on the top and sides of the cage,
   a closure mechanism secured within the L-shaped flange of the cage, said closure mechanism including a stainless steel door pivotably attached to the first edge on one said sidewall of the cage by a plurality of hinge brackets and a latching mechanism fixedly attached on the first edge on the opposite sidewall of the cage to allow for the locking of said door in a closed position.

2. The primary enclosure of claim 1 including a spacer constructed of rigid metal material to support a second cage in a spaced position on the top of the cage.

3. The primary enclosure of claim 1, wherein said second edge has a plurality of apertures for attaching the cage to a second edge of another cage by nut and bolt fasteners.

* * * * *